(12) United States Patent  
Ishikawa et al.

(10) Patent No.: US 7,264,121 B2
(45) Date of Patent: Sep. 4, 2007

(54) ARTICLE HOLDER

(75) Inventors: Junichi Ishikawa, Kawasaki (JP); Hidenori Shirai, Kawasaki (JP); Masatoshi Yokota, Kawasaki (JP)

(73) Assignee: Kao Corporation, Tokyo (JP)

( * ) Notice: Subject to any disclaimer, the term of this patent is extended or adjusted under 35 U.S.C. 154(b) by 58 days.

(21) Appl. No.: 10/426,697

(22) Filed: May 1, 2003

(65) Prior Publication Data
US 2003/0217947 A1 Nov. 27, 2003

(30) Foreign Application Priority Data
May 1, 2002 (JP) .............................. 2002-130121
Apr. 9, 2003 (JP) .............................. 2003-105844

(51) Int. Cl.
B65D 81/02 (2006.01)
(52) U.S. Cl. ...................................... 206/583; 206/592
(58) Field of Classification Search ............... 206/521, 206/523, 583, 591–594, 486
See application file for complete search history.

(56) References Cited
U.S. PATENT DOCUMENTS 1,194,466 A * 8/1916 Berg .......................... 206/591
2,527,541 A * 10/1950 Gibbs ......................... 206/591
2,956,687 A * 10/1960 Robichaud ................... 206/523
2,979,246 A * 4/1961 Liebeskind .................. 206/523
3,531,644 A * 9/1970 Koster ........................ 206/523
4,093,068 A * 6/1978 Smrt .......................... 206/593
5,590,782 A * 1/1997 Haber et al. ................ 206/593
5,819,780 A * 10/1998 Langan ....................... 206/443
6,561,353 B2 * 5/2003 Levieux et al. ............. 206/423

FOREIGN PATENT DOCUMENTS

| JP | 4-78199 | 7/1992 |
| JP | 10-194388 | 7/1998 |
| JP | 10-218192 | 8/1998 |
| JP | 11-245996 | 9/1999 |
| JP | 2000-079914 | 3/2000 |

* cited by examiner

Primary Examiner—Luan K. Bui
(74) Attorney, Agent, or Firm—Oblon, Spivak, McClelland, Maier & Neustadt, P.C.

(57) ABSTRACT

An article holder for holding an article including a main body configured to receive the article, and at least one deformable article receiving member disposed on a bottom plate of the main body. The deformable article receiving member is configured to deform so as to change a receiving height of the article inserted in the main body.

32 Claims, 13 Drawing Sheets

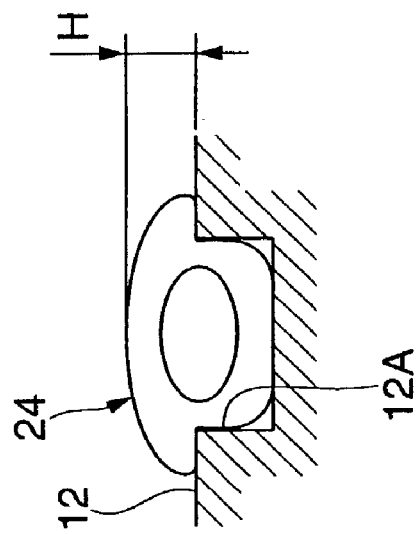
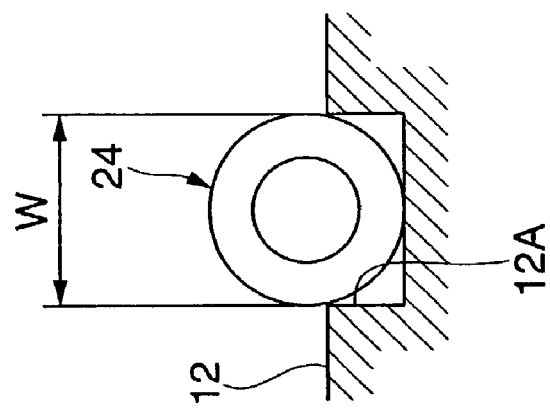
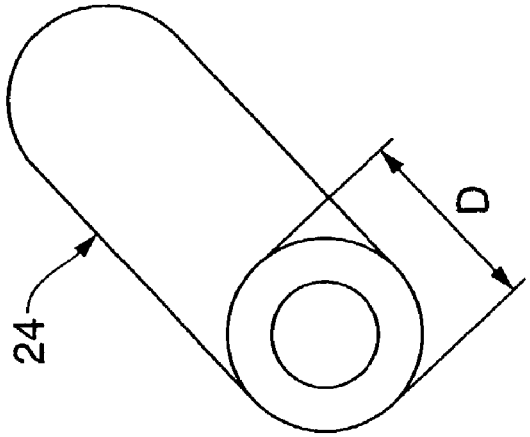

ARTICLE HOLDER

BACKGROUND OF THE INVENTION

1. Field of the Invention

The present invention relates to an article holder for holding an article such as a vessel and for positioning the article in a vessel treatment process, etc., in which filling and capping operations are executed.

2. Description of the Related Art

A background article holder has an article holding member for holding an article in a horizontal direction. A change in a lateral cross sectional shape of the article is dealt with by changing the article holding shape formed by the article holding member (see Japanese Patent Application Laid-Open No. 4-279496).

However, the above background article holder cannot deal with a change in a height of an article. Rather, the change of height of the article is dealt with by preparing a new article holder or altering the filling treatment apparatus.

In view of the above circumstances, the present applicant discloses an article holder capable of dealing with a change in a height of an article in Japanese Patent Application Laid-Open Nos. 10-194388 and 11-245996.

FIGS. 4 and 8 of Japanese Unexamined Patent Application Publications No. 10-194388 illustrate that vessels having different heights are dealt with by changing a height of sheaths by inserting and removing members 13 and 14 of FIG. 8. However, this process is difficult to handle vessels having a different height by production equipment such as a filling machine, a capper, etc., which must be adjusted in a height direction.

Japanese Patent Application Laid-Open No. 11-245996 discloses an article holder including parent and child sheaths to handle articles having different heights. However, the child sheath must be replaced for each different type of vessel. An extra space is also required to store the child sheaths.

SUMMARY OF THE INVENTION

Accordingly, an object of the present invention is to solve the above noted and other problems.

Another object of the present invention is to provide a novel article holder that easily adapts to articles having different heights.

To achieve these and other objects, the present invention provides an article holder for holding an article including a main body configured to receive the article, and at least one deformable article receiving member disposed on a bottom plate of the main body. The deformable article receiving member is configured to deform so as to change a receiving height of the article inserted in the main body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A to 6C are schematics showing another modification of an article receiving member;

DESCRIPTION OF THE PREFERRED EMBODIMENTS

Figure 1:
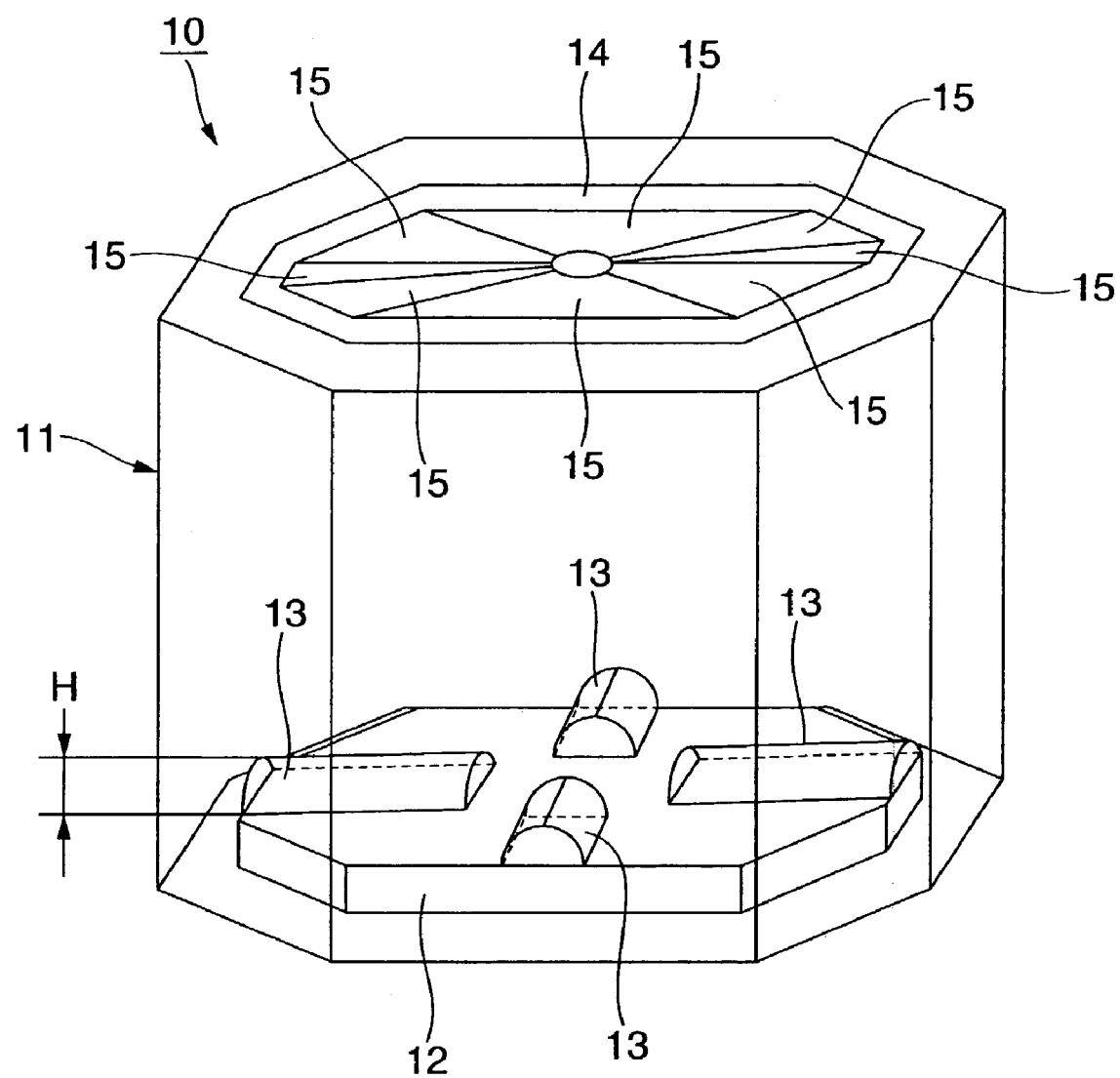
FIG. 1 is a schematic showing an article holder.

Referring now to the drawings, wherein like reference numerals designate identical or corresponding parts throughout the several views, the present invention will be described.

Figure 2A:
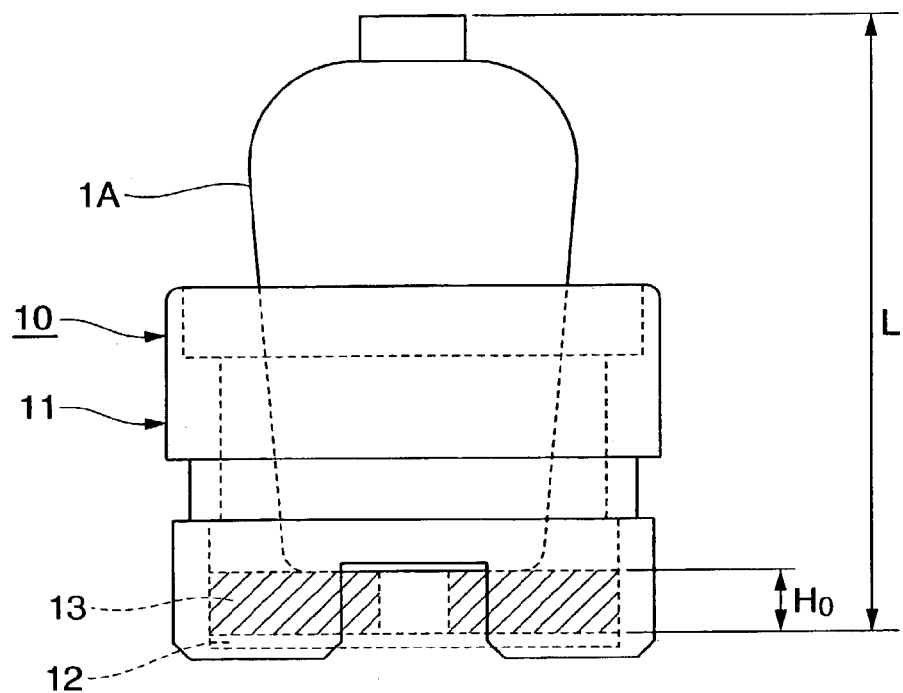
FIGS. 2A and 2B are schematics showing states in which a height of an article receiving member is changed.
Figure 2B:
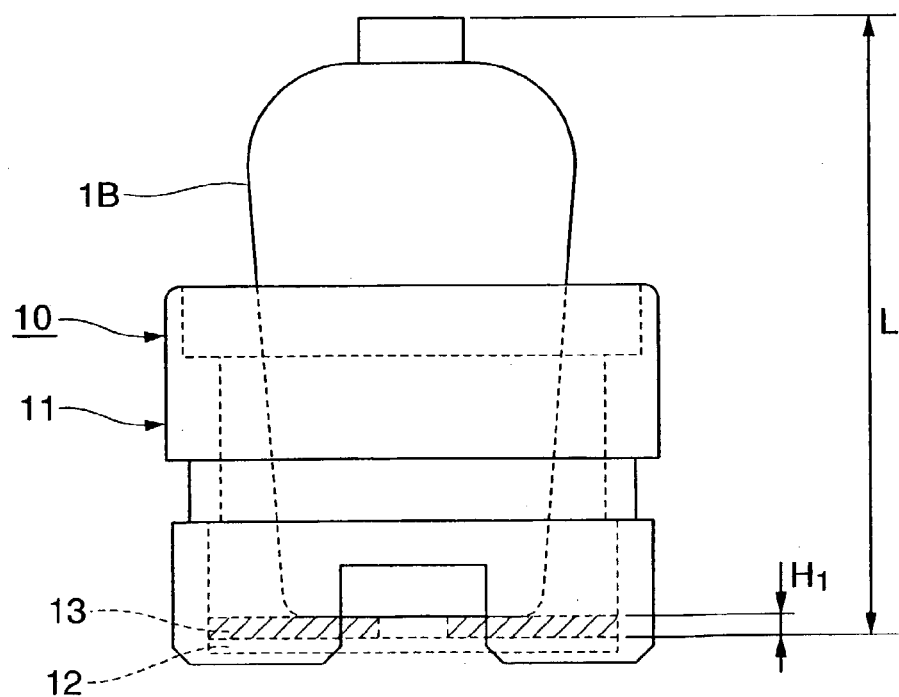

An article holder 10 shown in FIGS. 1 to 3 is used when an article 1 (shown as article 1A in FIG. 2A and as article 1B in FIG. 2B) such as a vessel is transported by a conveyer in a vessel treatment line in which filling and capping operations, for example, are executed to position the article 1 with respect to a filling nozzle of a filling machine and to a capping head, etc., of a capping apparatus in height and horizontal directions.

As shown in FIG. 1, the article holder 10 includes a main body 11 having a plurality of article receiving members 13 fixed to a bottom plate 12, which is mounted on and dismounted from the bottom of the holder main body 11 by an adhesive or screws, for example, so that the article receiving members 13 receive the article 1 in a height direction. The position in the height direction of the article 1, which is placed on the respective article receiving members 13, can be set by the article receiving height H of the respective article receiving members 13.

The article receiving members 13 are deformable members which permit the article receiving height H to be changed. A resin or alloy, for example, may be used as a material for the deformable members. The deformable member also returns to its initial shape at a temperature higher than a given temperature such as a transition temperature of the material. The deformable member also maintains a deformed shape at a temperature lower than the transition temperature such as a room temperature the vessel treatment line is operating in.

Figure 3A:
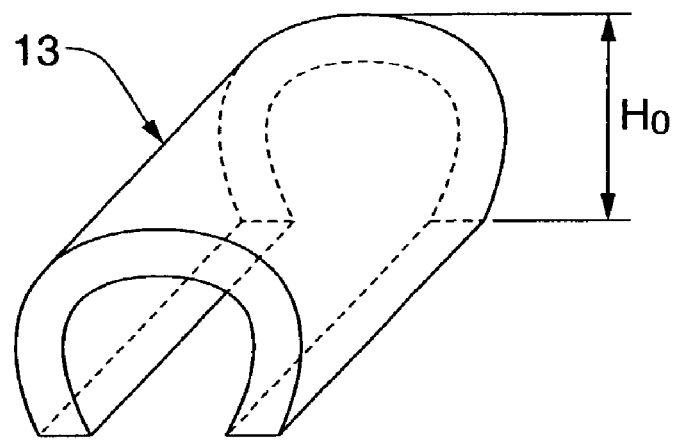
FIGS. 3A and 3B are schematics showing a shape of the article receiving member before it is deformed and after it is deformed.
Figure 3B:
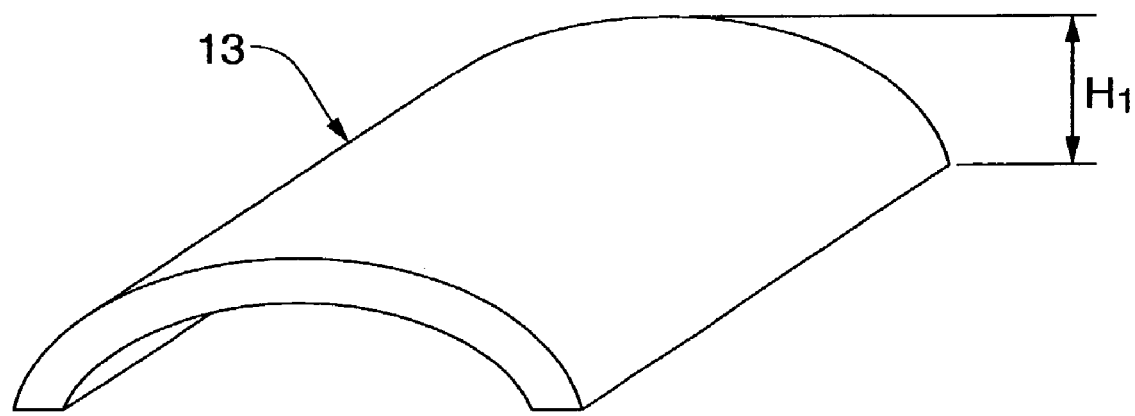

The article receiving members 13 shown in FIGS. 1, 2A and 2B comprises a pipe shape, the initial height of the article receiving member 13 shown in FIG. 3A is represented by Ho, and the height of the deformed article receiving members 13 as shown in FIG. 3B is represented by Hi.

Accordingly, the initial shape of article receiving member 13 shown in FIG. 3A may be used for a short article 1A (see FIG. 2A) and the deformed article receiving member 13 as shown in FIG. 3B may be used for a taller article 1B (see FIG. 2B). As shown, the height of the upper ends of the respective articles 1A and 1B is adjusted according to the article receiving heights Ho and H1 of the article receiving member 13. As a result, it is possible to set the height positions L for both the articles 1A and 1B at the upper ends to be equal, even though the height of the articles 1A and 1B are different.

Further, as shown in FIG. 1, the article holder 10 has a plurality of article holding members 15 fixed, for example, by screws to a frame member 14 disposed at an upper portion of the holder main body 11 so that the article holding members 15 hold the article 1 in a horizontal direction. In addition, the article holding members 15 grasp the contour of the lateral cross section of the article 1, which faces the article holding members 15, thereby holding the article in the horizontal direction.

The article holding members 15 also include deformable members so the shape can be changed. Again the deformable members may be a resin or alloy type material, for example. Similar to the deformable article receiving members 13, the deformable article holding members 15 return to an initial state (e.g., a plate shape) at a temperature higher than the transition temperature, for example, and can be deformed to conform to an article. The deformable article holding members 15 may also maintain a deformed shape at a temperature such as room temperature that the process is operating in, which is lower than the transition temperature, so as to hold the article. Accordingly, the article holding members 15 are deformed into shapes that contour a shape of an article to be held. Thus, the article holding members 15 stably hold the article 1.

An operation of the article holder will now be described.

As discussed above, the deformable article receiving members 13 can be deformed (i.e., changed) so as to have article receiving heights that correspond to desired height positions set to various types of articles. Further, the deformable receiving members 13 can be set to maintain a deformed shape (by placing the members 13 at room temperature, for example), thereby fixing the desired article heights. Thus, a wide variety of article receiving heights can be accommodated using a simple arrangement.

When the height positions L of the articles 1A and 1B accommodated in the article holder 10 are set to be equal to each other, it is not necessary to adjust the height of the filling machine, the capping apparatus, etc., and it is not necessary to provide a mechanism for changing the rising/falling stroke of bottle tables of the filling apparatus.

In addition, the shape of the deformable article holding members 15 can be changed into various shapes corresponding to various types of lateral cross sectional shapes of articles. Similar to the deformable receiving members 13, the shape of the deformable holding members 15 can be fixed. Thus, a wide variety of shapes can be formed with a simple arrangement.

Modifications of the article receiving members 13 will now be explained with reference to the additional figures.

Figure 4A:
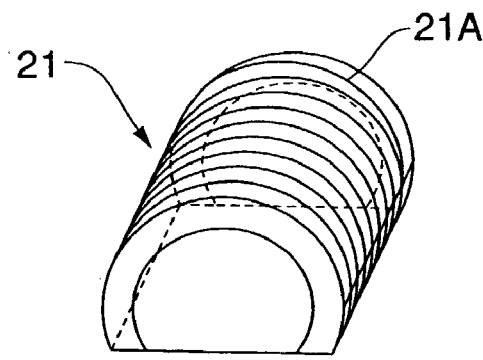
FIGS. 4A to 4E are schematics showing modifications of an article receiving member.

First, FIG. 4A shows a split pipe-shaped deformable article receiving member 21 having a plurality of slits 21A formed on an outer periphery. The slits 21A are parallel with each other, and are formed to more easily deform the article receiving member 21.

Figure 4B:
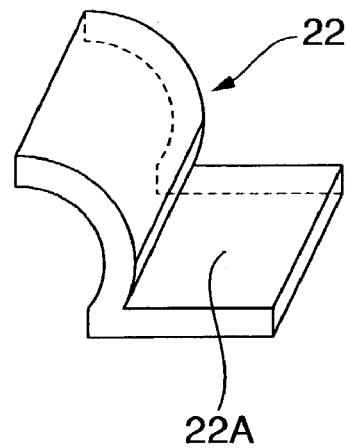
Figure 4C:
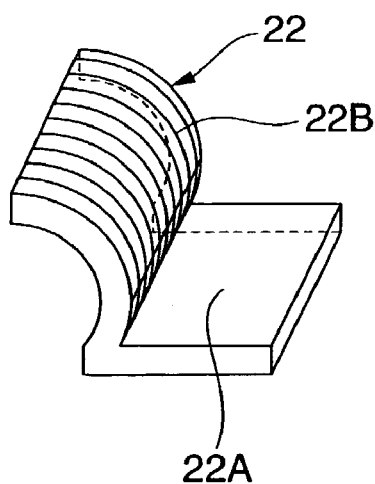

FIG. 4B shows an arc-plate-shaped deformable article receiving member 22 having a leg 22A disposed on one side and fixed to the bottom plate 12 (shown in FIG. 1). FIG. 4C shows the deformable article receiving member 22 having a plurality of slits 22B formed on an outer periphery of the member 22 and being parallel with each other to more easily deform the article receiving member 22.

Figure 4D:
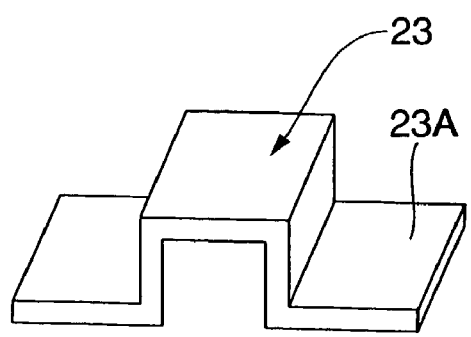
Figure 4E:
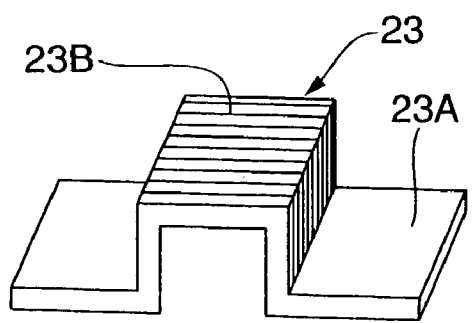

In addition, FIG. 4D shows a square-plate-shaped deformable article receiving member 23 having legs 23A disposed on both sides and fixed to the bottom plate 12. FIG. 4E shows the article receiving member 23 having a plurality of slits 23B formed on the outer periphery of the member 23 and being parallel with each other to more easily deform the article receiving member 23.

Figure 5:
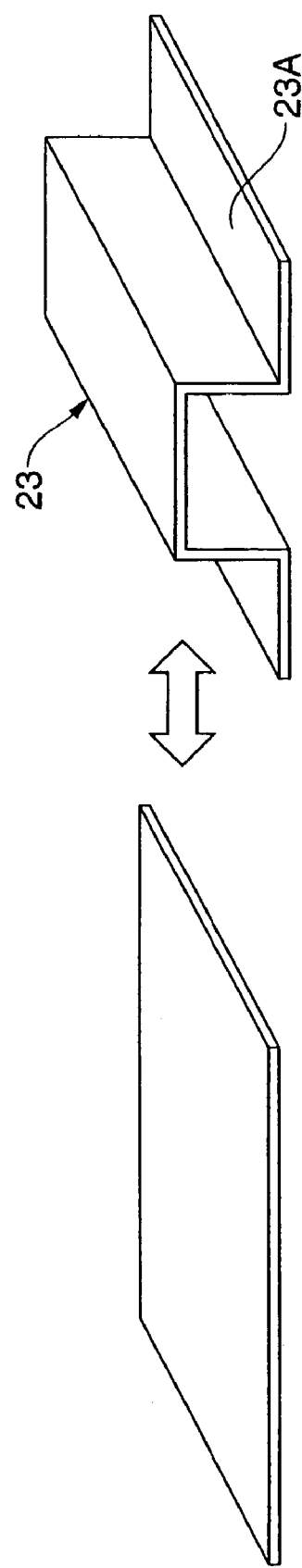
FIG. 5 is a schematic showing a process for applying a shape to an article receiving member.

As shown in FIG. 5, the article receiving member 23 may be formed by deforming a thin-plate-shaped member by a jig (this is also similarly applied to the article receiving members 13, 21 and 22). While metal may be used as the deformable member, resin is preferable because it can be easily deformed and easily return to its initial shape.

Next, FIGS. 6A to 6C show a deformable cylindrical article receiving member 24 having a diameter D. As shown, the deformable article receiving member 24 is inserted into a groove 12A formed on the bottom plate 12 (shown in FIG. 1) having a width W (W≈D) to set an article receiving height H. The article receiving height H may be adjusted by the force applied to insert the article receiving member 24.

Figure 7A:
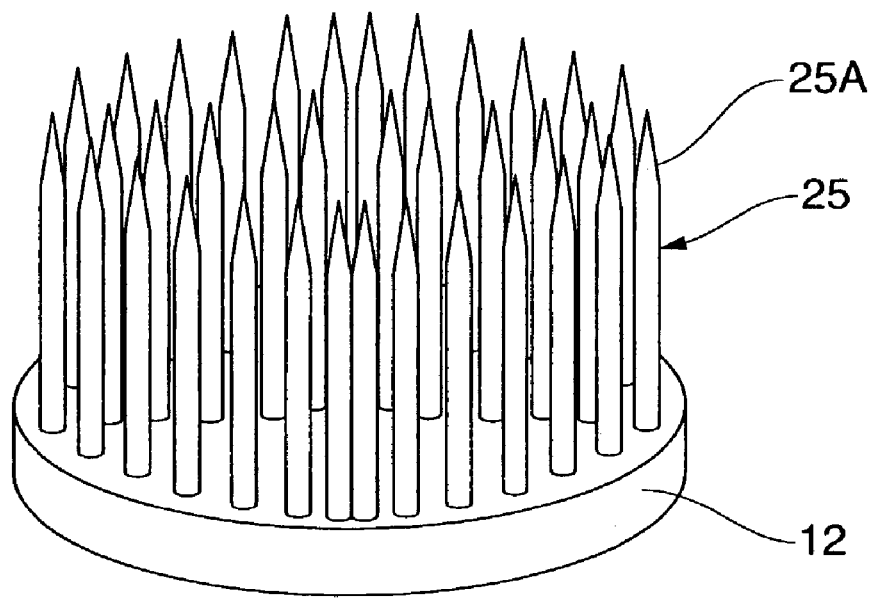
FIGS. 7A and 7B are schematics showing still another modification of an article receiving member.
Figure 7B:
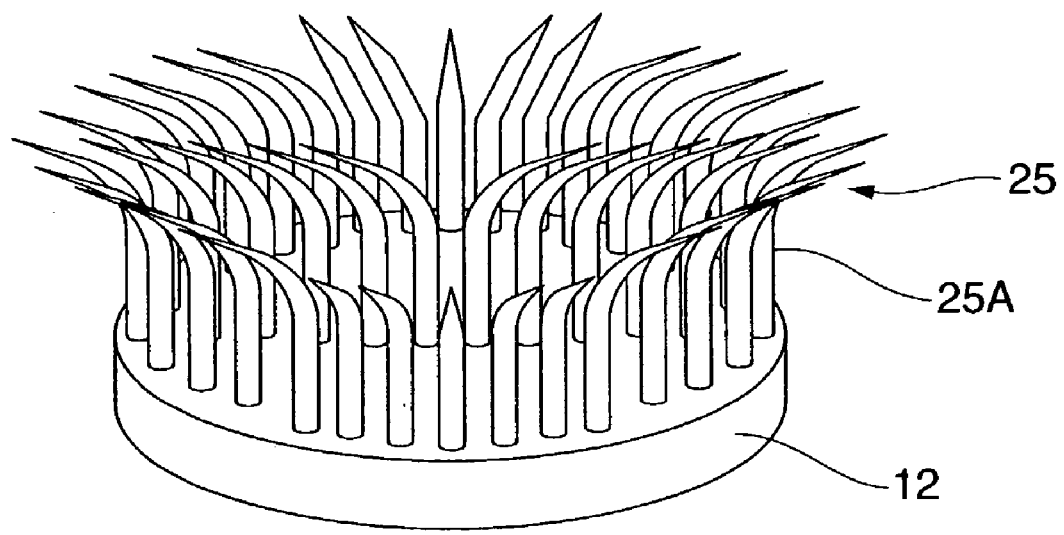

Turning now to FIGS. 7A and 7B, which show a pin-shaped article receiving member 25 including a plurality of deformable bar-like members 25A planted on the bottom plate 12. Respective members 25A may be deformed into a desired article receiving shape by being bent and deformed so as to follow the bottom surface of an article model (see FIG. 7B).

Further, FIGS. 8A, 8B, 9A and 9B show a plurality of deformable article receiving members 32 fixed to a frame member 31, which is mounted on and dismounted from the bottom of the holder main body 11 by screws, for example, so that the article receiving members 32 receive the article 1 in a height direction. The height position of the article 1 placed on the respective article receiving member 32 is set by the height H of the receiving members 32.

Figure 8A:
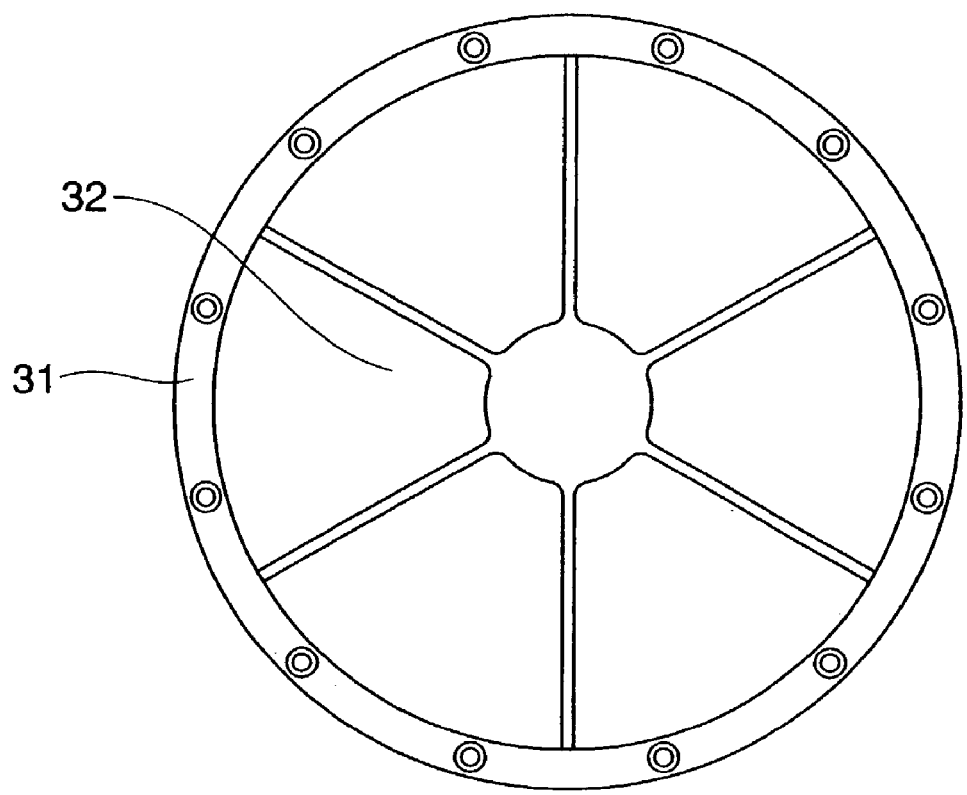
FIGS. 8A and 8B are schematics showing a shape of an article receiving member before it is deformed.
Figure 8B:
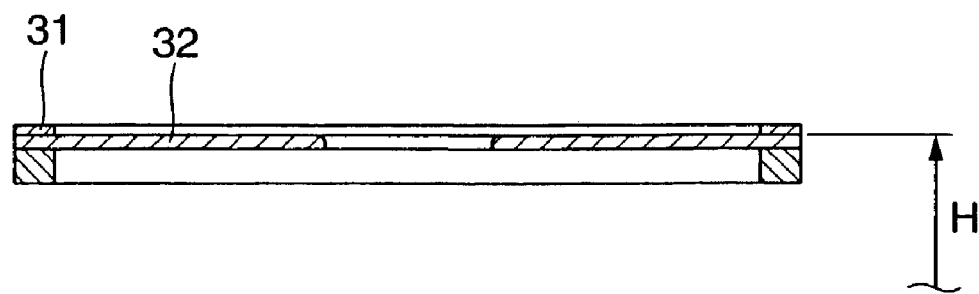
Figure 9A:
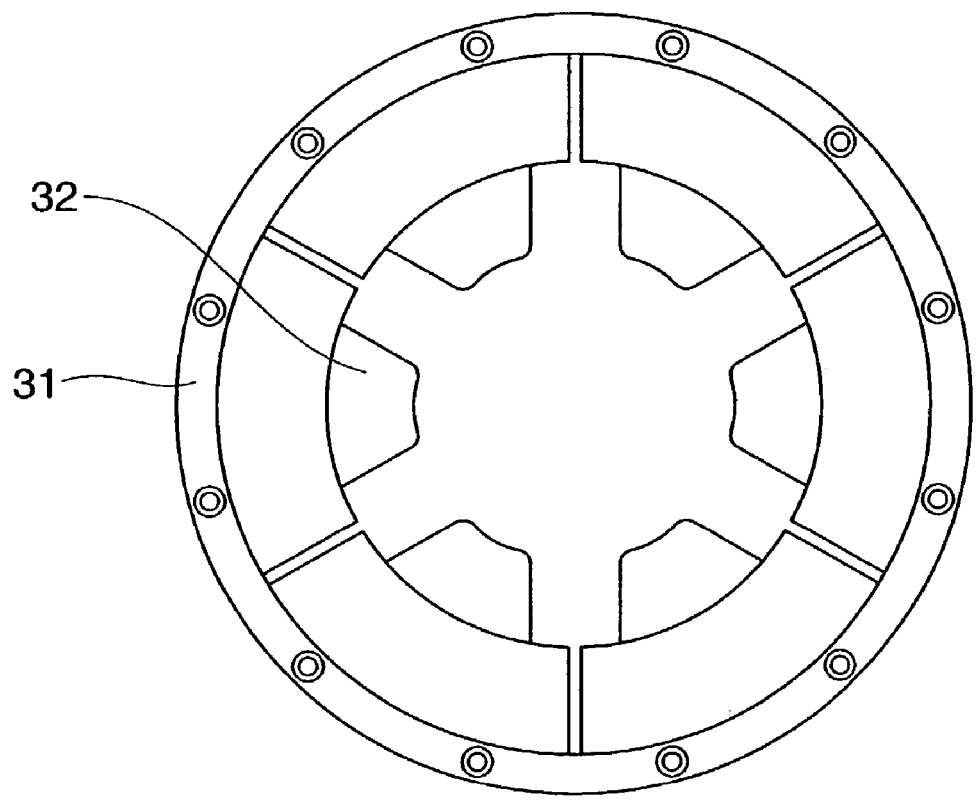
FIGS. 9A and 9B are schematic views showing a shape of the article receiving member after it is deformed.
Figure 9B:
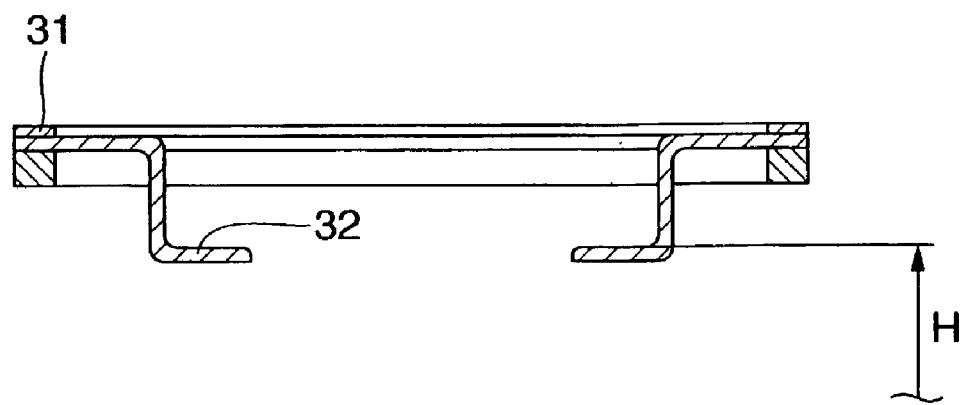

The deformable article receiving members 32 are similar to the deformable article receiving members 13 and can change the article receiving height H. In addition, the deformable members 32 also return to an initial state (for example, a flat-plate shape as shown in FIGS. 8A and 8B) at a temperature higher than a temperature such as a transition temperature (e.g., a glass transition temperature) and can be optionally deformed into a shape to set a desired height and to conform to the bottom surface of the article model. Then, the shape and height are fixed at a temperature at which the process is operated in, such as room temperature that is lower than the transition temperature, as shown in FIGS. 9A and 9B.

Further modifications of the article holder 10 will now be discussed.

Figure 10:
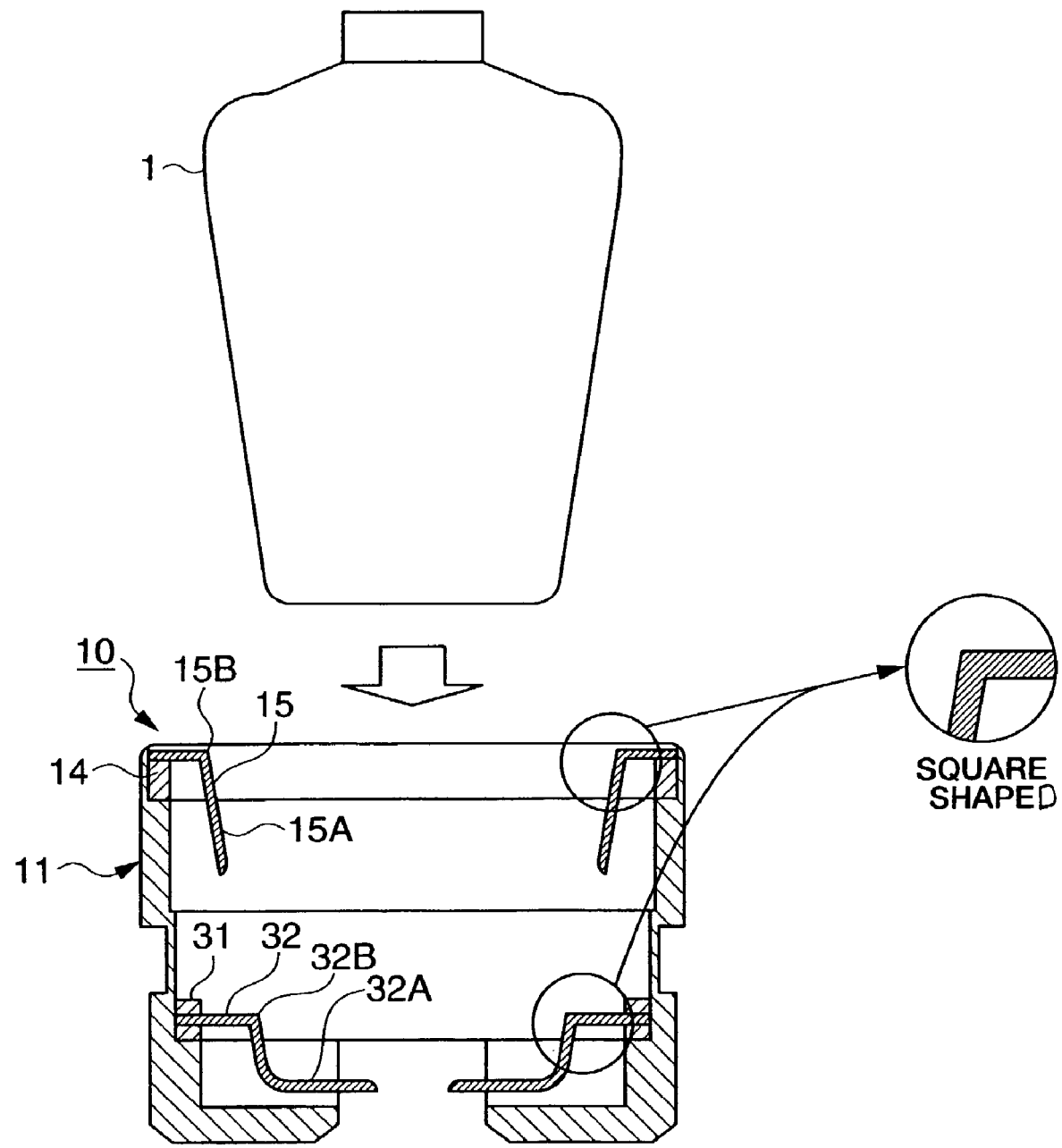
FIG. 10 is a schematic view showing yet another modification of the article holder.

The article holder 10 shown in FIG. 10 includes the deformable article receiving members 32 (with the frame 31) shown in FIGS. 8A, 8B, 9A and 9B, and the deformable article holding members 15 (with the frame 14) shown in FIG. 1 assembled to the holder main body 11. The article holder 10 also has an article holding surface 15A formed by deforming the ends of the article holding members 15 into a curved shape conforming to the outside shape (side surface) of the lateral cross section of the article 1, and by deforming the ends into a slanted article holding shape conforming to the outside shape (side surface) of the longitudinal cross section of the article 1. Similarly, the article holder 10 has an article receiving surface 32A formed by deforming the ends of the article receiving members 32 into a curved shape conforming to the outside shape (side surface) of the lateral cross section of the article 1, and by deforming the ends into a curved shape conforming to the outside shape (side and bottom surfaces) of the longitudinal cross section of the article 1 on the bottom side thereof.

According to the article holder 10 shown in FIG. 10, the article 1 is held by the slanted article holding surface 15A on the side surface thereof and is supported by the curved article receiving surface 32A on the side and bottom surfaces. Thus, the article 1 can be set at a position having a desired height while being stably held.

Note that in the article holder 10 shown in FIG. 10, an article inserting port 15B located at an uppermost end of the article holding surface 15A is formed in a square shape. Similarly, an article inserting port 32B located at the uppermost end of the article holding surface 32A is formed in a square shape.

Figure 11:
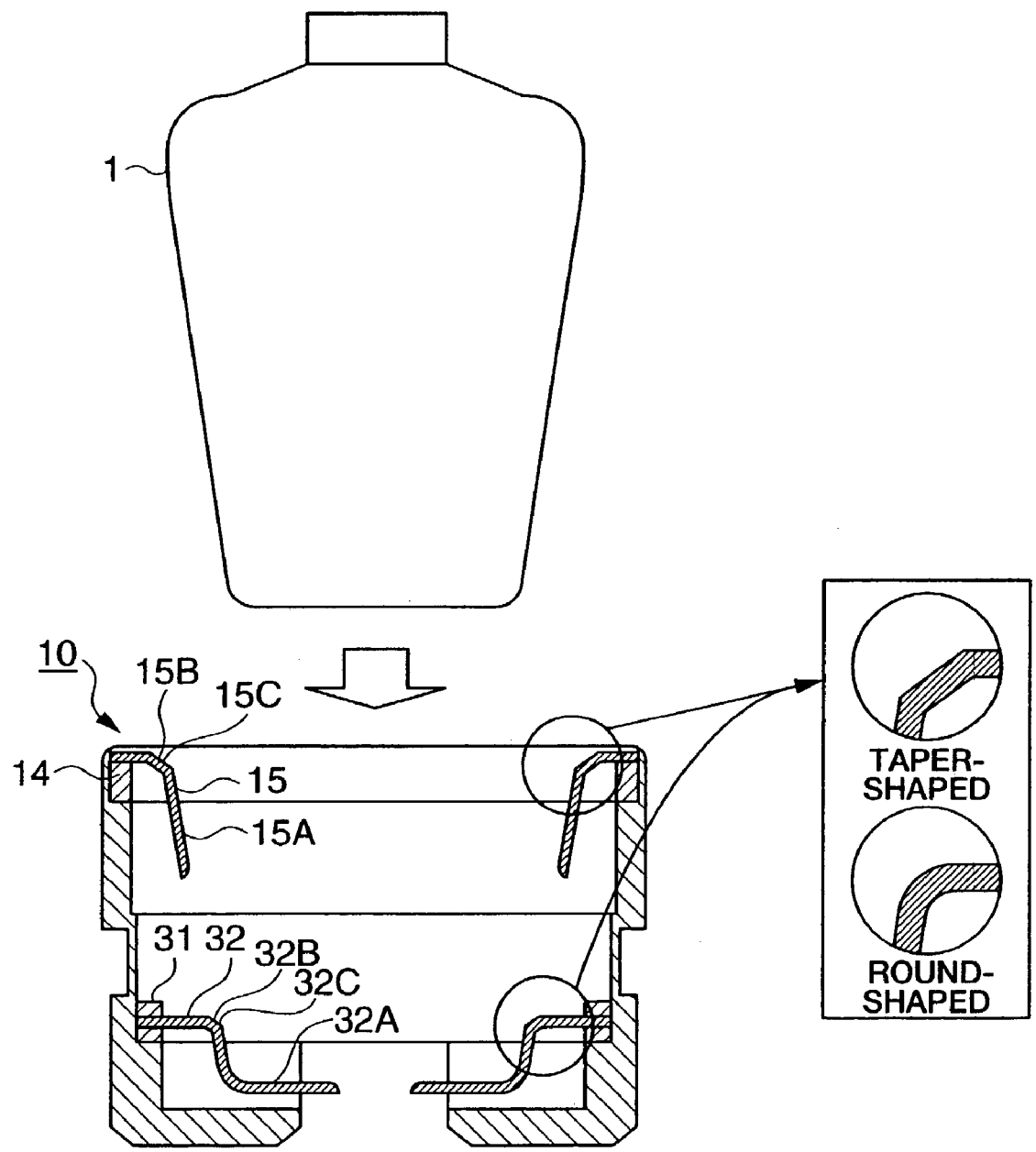
FIG. 11 is a schematic view showing still another modification of the article holder.

The article holder 10 shown in FIG. 11 includes taper-shaped or round-shaped article introduction guide surfaces 15C formed in the article inserting port 15B, and includes taper-shaped or round-shaped article introduction guide surfaces 32C formed in the article inserting port 32B.

Thus, when the article 1 is inserted into the article inserting port 15B or into the article inserting port 32B manually or by using an insertion device, the article 1 is smoothly guided by the article introduction guide surfaces 15C and 32C and is easily inserted.

Figure 12:
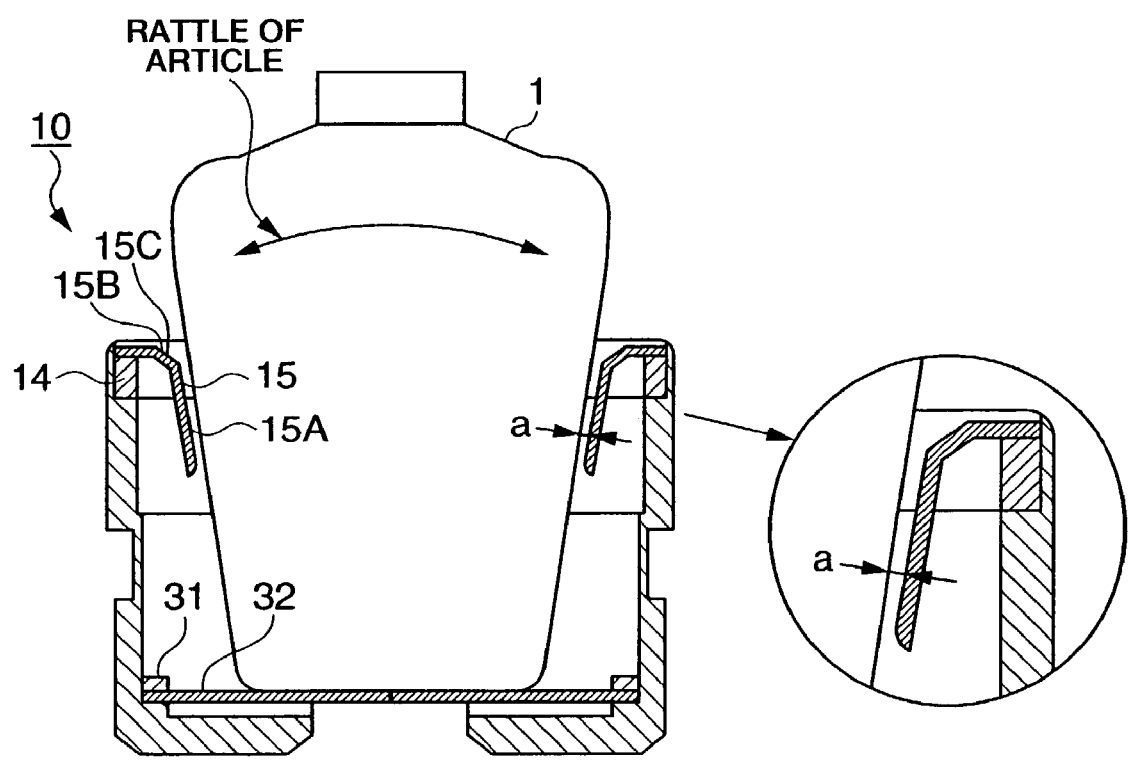
FIG. 12 is a schematic view showing another modification of the article holder.

In addition, an article holder 10 shown in FIG. 12 includes the deformable article receiving members 32 (with the frame 31) shown in FIGS. 8A, 8B, 9A and 9B and the deformable article holding members 15 (with the frame 14) shown in FIG. 1 assembled to the holder main body 11. Further, the article holder 10 includes the article holding surface 15A and inserting port 15B. Also, as shown, a clearance "a" is formed between the article 1 and the article holding surface 15A and article inserting port 15B so the article 1 can be easily inserted into the article inserting port 15B when taper-shaped or round-shaped article introduction guide surfaces 15C are formed in the article inserting port 15B.

Note that in FIG. 12, the article 1 may rattle or shake due to the gap "a," but that the article 1 may be easily inserted into the holder 10. However, the article holder 10 of FIG. 13 includes the article receiving surface 32A shown in FIGS. 10 and 11. With this arrangement, the article 1 is held on the outer periphery bottom portion thereof even if the article 1 is shaken or rattled by, for example, a filling machine, a capper, an image checker, and the like in a range in which the article 1 can be automatically manufactured on the article receiving surface 32A using a wrapping machine. The taper-shaped or round-shaped article introduction guide surfaces 32C may also be formed in the article inserting port 32B.

In addition, the clearance "a" (for example, "a"=about 2 to 3 mm) is formed to permit the article 1 to be easily inserted (e.g., when it is inserted by, for example, free fall). Further, a clearance "b" may be formed between the article receiving members 32 and the article 1 within a range of dimensional variation (for example, b=about 0.3 to 1 mm) resulting from the molding conditions thereof (when the article 1 is, for example, a resin vessel).

Figure 13:
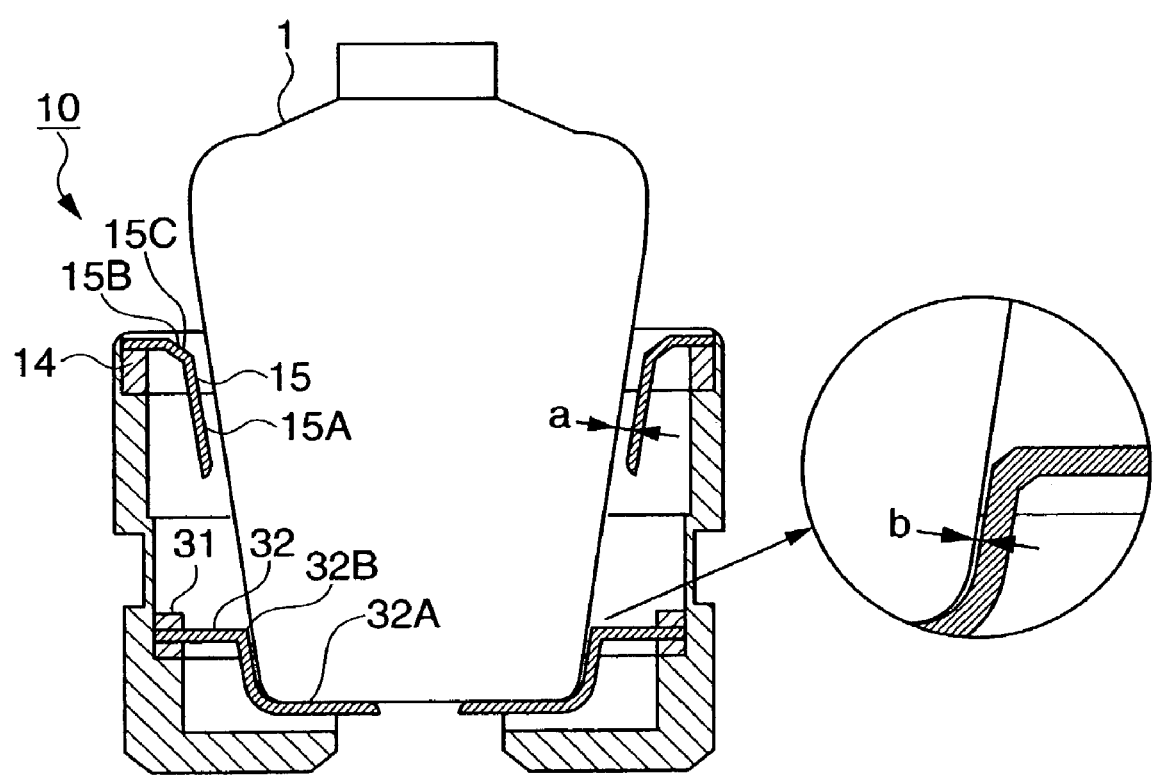
FIG. 13 is a schematic view showing a further modification of the article holder.

The article holder 10 of FIG. 13 can stably hold the article 1 without rattling or shaking the article 1 and sets the article 1 at a position having a desired height while permitting the article 1 to be easily inserted.

The deformable article receiving and holding members may include thermoplastic resin such as vinyl chloride resin, polyethylene resin, polypropylene resin, etc. The thermoplastic resin can be softened at a temperature higher than a given temperature (a softening point temperature of the thermoplastic resin) and deformed into an article receiving and holding shapes as discussed above, and then fixed to maintain the desirable shapes by placing the holder in an operating environment having a temperature for example, a room temperature lower than the given temperature (the softening point temperature of the thermoplastic resin).

When thermoplastic resin is used as the article receiving and holding members, the article holder can be simply arranged, and even if the article holder is used in a high temperature region or a highly humid environment, the article holder can be stably used for a long period of time without losing the article receiving and holding shapes.

Note that when printing must be performed to an article while it is transported in a state in which it is accommodated in the article holder, it is preferable to provide a passing-through opening, which acts as an ink path of ink ejected by a print head, on the bottom or a side wall of the article holder.

Obviously, numerous modifications and variations of the present invention are possible in light of the above teachings. It is therefore to be understood that within the scope of the appended claims, the invention may be practiced otherwise than as specifically described herein.

The invention claimed is:

1. An article holder for holding an article, comprising:
   a main body configured to receive the article;
   at least one deformable article receiving member disposed on a bottom portion of the main body and configured to deform so as to change a receiving height of the article inserted into the main body;
   at least one deformable article holding member disposed in a top portion of the main body and configured to deform so as to correspond with an outer shape of the article and to stably hold the article;
   an article holding surface corresponding to deformed ends of the deformable article holding member, said deformed ends comprising a shape corresponding to an outer shape of a lateral cross section of the article; and
   an article receiving surface corresponding to deformed ends of the deformable article receiving member, said deformed ends comprising a shape corresponding to an outer shape of a longitudinal cross section of the article.

2. The article holder according to claim 1, wherein the deformable article receiving member comprises an arc-plate-shape and includes a leg disposed on one side and fixed to the bottom portion of the main body.

3. The article holder according to claim 1, wherein the deformable article receiving member comprises a square-plate-shape and includes legs disposed on both sides and fixed to the bottom portion of the main body.

4. The article holder according to claim 3, wherein the deformable article receiving member comprises a plurality of parallel slits on an outer periphery on portions other than the legs.

5. The article holder according to claim 1, wherein the deformable article holding member comprises a plurality of plate-shape members disposed around the top portion of the main body.

6. The article holder according to claim 1, wherein a gap is set between the deformable article holding member and the article.

7. The article holder according to claim 1, wherein the article holding and receiving surfaces comprise at least one of a round-shape and a taper-shape.

8. The article holder according to claim 1, wherein the material includes a resin.

9. The article holder according to claim 1, wherein the material includes an alloy.

10. An article holder for holding an article, comprising:
a main body configured to receive the article;
at least one deformable article receiving member disposed on a bottom portion of the main body and configured to deform so as to change a receiving height of the article inserted into the main body;
at least one deformable article holding member disposed in a top portion of the main body and configured to deform so as to correspond with an outer shape of the article and to stably hold the article;
a first article introduction guide surface corresponding to a deformed portion of the deformable article holding member; and
a second article introduction guide surface corresponding to a deformed portion of the deformable article receiving member.

11. The article holder according to claim 10, wherein the first and second introduction surfaces comprise a round shape.

12. The article holder according to claim 10, wherein the deformable article receiving member comprises an arc-plate-shape and includes a leg disposed on one side and fixed to the bottom portion of the main body.

13. The article holder according to claim 10, wherein the deformable article receiving member comprises a square-plate-shape and includes legs disposed on both sides and fixed to the bottom portion of the main body.

14. The article holder according to claim 13, wherein the deformable article receiving member comprises a plurality of parallel slits on an outer periphery on portions other than the legs.

15. The article holder according to claim 10, wherein the deformable article holding member comprises a plurality of plate-shape members disposed around the top portion of the main body.

16. The article holder according to claim 10, wherein a gap is set between the deformable article holding member and the article.

17. The article holder according to claim 10, wherein the material includes a resin.

18. The article holder according to claim 10, wherein the material includes an alloy.

19. An article holder for holding an article, comprising:
means for receiving the article;
at least one deformable article receiving means disposed on a bottom portion of the means for receiving and for deforming so as to change a receiving height of the article inserted into the means for receiving;
at least one deformable article holding means disposed in a top portion of the means for receiving and for deforming so as to correspond with an outer shape of the article and to stably hold the article;
an article holding surface corresponding to deformed ends of the deformable article holding means, said deformed ends comprising a shape corresponding to an outer shape of a lateral cross section of the article; and
an article receiving surface corresponding to deformed ends of the deformable article receiving means, said deformed ends comprising a shape corresponding to an outer shape of a longitudinal cross section of the article.

20. The article holder according to claim 19, wherein the deformable article receiving means comprises a square-plate-shape and includes legs disposed on both sides and fixed to the bottom portion of the means for receiving.

21. The article holder according to claim 19, wherein the deformable article holding means comprises a plurality of plate-shape members disposed around the top portion of the means for receiving.

22. The article holder according to claim 19, wherein a gap is set between the deformable article holding means and the article.

23. The article holder according to claim 19, wherein the article holding and receiving surfaces comprise at least one of a round-shape and a taper-shape.

24. The article holder according to claim 19, wherein the material includes a resin.

25. The article holder according to claim 19, wherein the material includes an alloy.

26. An article holder for holding an article, comprising:
means for receiving the article;
at least one deformable article receiving means disposed on a bottom portion of the means for receiving and for deforming so as to change a receiving height of the article inserted into the means for receiving;
at least one deformable article holding means disposed in a top portion of the means for receiving and for deforming so as to correspond with an outer shape of the article and to stably hold the article;
a first article introduction guide surface corresponding to a deformed portion of the deformable article holding means; and
a second article introduction guide surface corresponding to a deformed portion of the deformable article receiving means.

27. The article holder according to claim 26, wherein the first and second introduction surfaces comprise a round shape.

28. The article holder according to claim 26, wherein the deformable article receiving means comprises a square-plate-shape and includes legs disposed on both sides and fixed to the bottom portion of the means for receiving.

29. The article holder according to claim 26, wherein the deformable article holding means comprises a plurality of plate-shape members disposed around the top portion of the means for receiving.

30. The article holder according to claim 26, wherein a gap is set between the deformable article holding means and the article.

31. The article holder according to claim 26, wherein the material includes a resin.

32. The article holder according to claim 26, wherein the material includes an alloy.

* * * * *